(12) United States Patent
Sinclair et al.

(10) Patent No.: US 9,916,003 B1
(45) Date of Patent: Mar. 13, 2018

(54) 3D HAPTICS FOR INTERACTIVE COMPUTER SYSTEMS

(71) Applicant: Microsoft Technology Licensing, LLC, Redmond, WA (US)

(72) Inventors: Michael Jack Sinclair, Kirkland, WA (US); Eyal Ofek, Redmond, WA (US); Hrvoje Benko, Seattle, WA (US); Christian Holz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/255,866

(22) Filed: Sep. 2, 2016

(51) Int. Cl.
*G06F 3/041* (2006.01)
*G06F 3/01* (2006.01)

(52) U.S. Cl.
CPC .............. *G06F 3/011* (2013.01); *G06F 3/016* (2013.01); *G06F 3/041* (2013.01); *G06F 2203/04101* (2013.01); *G06F 2203/04105* (2013.01)

(58) Field of Classification Search
CPC .......... G06F 3/011; G06F 3/041; G06F 3/016; G06F 2203/04101; G06F 2203/04105
See application file for complete search history.

(56) References Cited

U.S. PATENT DOCUMENTS

| | | |
|---|---|---|
| 5,803,738 A | 9/1998 | Latham |
| 6,697,044 B2 | 2/2004 | Shahoian et al. |
| 7,098,888 B2 | 8/2006 | Temkin et al. |
| 7,812,815 B2 | 10/2010 | Banerjee et al. |
| 9,142,105 B1 | 9/2015 | Crofford |
| 2005/0285854 A1 | 12/2005 | Morita et al. |
| 2006/0209019 A1 | 9/2006 | Hu |
| 2010/0245237 A1 | 9/2010 | Nakamura |
| 2011/0121953 A1* | 5/2011 | Grant .................. A63F 13/245 340/407.1 |
| 2014/0088941 A1 | 3/2014 | Banerjee et al. |
| 2014/0247240 A1 | 9/2014 | Sinclair et al. |
| 2015/0325027 A1 | 11/2015 | Herman et al. |
| 2017/0124767 A1* | 5/2017 | Foust ...................... G06T 7/004 |
| 2017/0212589 A1* | 7/2017 | Domenikos ............ G06F 3/014 |

OTHER PUBLICATIONS

Anttila, Tommi, "A Haptic rendering system for virtual handheld electronic products", In Publication of Technical Research Centre of Finland, Retrieved on: Jun. 15, 2015, 69 pages.

(Continued)

*Primary Examiner* — Erin File
(74) *Attorney, Agent, or Firm* — Drink Biddle & Reath LLP

(57) ABSTRACT

A controller device for a virtual environment includes a handle and a contact device having a substantially planar surface. A position of the contact device relative to the handle is adjustable. An actuator module is arranged to adjust the position of the contact device relative to the handle. A control module in communication with the virtual environment selectively controls the actuator module to adjust the position of the contact device in response to data received from the virtual environment. The data includes an indication of an interaction between a user and an object represented within the virtual environment.

20 Claims, 8 Drawing Sheets

(56) References Cited

OTHER PUBLICATIONS

Scheggi, et al., "Touch the virtual reality: using the Leap Motion controller for hand tracking and wearable tactile devices for immersive haptic rendering", In Proceedings of 42nd International Conference and Exhibition on Computer Graphics and Interactive Techniques, Aug. 9, 2015, 1 page.
Sinclair, et al., "TouchMover: Actuated 3D Touchscreen with Haptic Feedback", In Proceedings of the ACM international conference on Interactive tabletops and surfaces, Oct. 6, 2013, pp. 287-296.
Fisch, et al., "Haptic Devices for Virtual Reality, Telepresence and Human-Assistive Robotics", In Publication of SPIE, Nov. 16, 2010, 24 pages.
"Haptic devices that add the sense of Touch to your digital world", Published on: Sep. 8, 2015 Available at: http://www.geomagic.com/en/products-landing-pages/haptic.
Buckley, Sean, "5 Ludicrous Controllers That Help You Touch the Virtual World", Published on: May 3, 2015 Available at: http://gizmodo.com/5-ludicrous-controllers-that-help-you-touch-the-virtual-1689562796.
Alexander, et al., "Tilt Displays: Designing Display Surfaces with Multi-axis Tilting and Actuation", In Proceedings of 14th International Conference on Human-Computer Interaction with Mobile Devices and Services, Sep. 21, 2012, pp. 181-170.
Bau, et al., "TeslaTouch: Electrovibration for Touch Surfaces", In Proceedings of 23nd Annual ACM Symposium on User Interface Software and Technology, Oct. 3, 2010, pp. 283-292.
Benali-Khoudja, et al., "Tactile interfaces: a state-of-the-art survey", In Proceedings of 35th International Symposium on Robotics, vol. 31, Mar. 23, 2004, pp. 1-9.
Bowman, et al., "3D User Interfaces: Theory and Practice", In Publication of Addison-Wesley Professional, Jul. 26, 2004.
Bouzit, et al., "The Rutgers Master II-ND Force Feedback Glove", In Proceedings of 10th Symposium on Haptic Interfaces for Virtual Environment and Teleoperator Systems, Mar. 2002, 8 pages.
Brewster, et al., "Tactons: Structured Tactile Messages for Non-Visual Information Display", In Proceedings of 5th Australasian User Interface Conference, vol. 28, Jan. 18, 2004, pp. 15-23.
Carter, et al., "UltraHaptics: Multi-Point Mid-Air Haptic Feedback for Touch Surfaces", In Proceedings of 26th Annual ACM Symposium on User Interface Software and Technology, Oct. 8, 2013, pp. 505-514.
Choi, et al., "Development of Integrated Tactile Display Devices", In Proceedings of SPIE vol. 7287—Electroactive Polymer Actuators and Devices, Apr. 6, 2009, 8 pages.
"CyberGrasp", Retrieved on: Jun. 20, 2016. Available at: http://www.cyberglovesystems.com/cybergrasp/.
"CyberTouch", Retrieved on: Jun. 20, 2016 Available at: http://www.cyberglovesystems.com/cybertouch/.
Follmer, et al., "inFORM: Dynamic Physical Affordances and Constraintsthrough Shape and Object Actuation", In Proceedings of 26th Annual ACM Symposium on User Interface Software and Technology, Oct. 8, 2013, pp. 417-426.
Hayward, et al., "Haptic Interfaces and Devices", In Sensor Review Journal, vol. 24, No. 1, Mar. 2004, pp. 16-29.
Hemmert, et al., "Take me by the Hand: Haptic Compasses in Mobile Devices through Shape Change and Weight Shift", In Proceedings of 6th Nordic Conference on Human-Computer Interaction; Extending Boundaries, Oct. 16, 2010, pp. 671-674.
Holz, et al, "The Generalized Perceived Input Point Model and How to Double Touch Accuracy by Extracting Fingerprints", In Proceedings of SIGCHI Conference on Human Factors in Computing Systems, Apr. 10, 2010, pp. 581-590.
Holz, et al., "Understanding Touch", In Proceedings of SIGCHI Conference on Human Factors in Computing Systems, May 7, 2011, pp. 2501-2510.

Iwata, et al., "Project FEELEX: Adding Haptic Surface to Graphics", In Proceedings of 28th Annual Conference on Computer Graphics and Interactive Techniques, Aug. 12, 2001, pp. 469-475.
Jang, et al., "Haptic Edge Display for Mobile Tactile Interaction", In Proceedings of CHI Conference on Human Factors in Computing Systems, May 7, 2016, pp. 3706-3716.
Kim, et al., "Real-time area-based haptic rendering and the augmented tactile display device for a palpation simulator", In Journal of Advanced Robotics, vol. 21, No. 9, Sep. 2007, pp. 961-981.
Krusteva, et al., "Marionette: a Multi-Finger Tilt Feedback Device for Curvatures and Haptic Images Perception", In Proceedings of 33rd Annual ACM Conference Extended Abstracts on Human Factors in Computing Systems, Apr. 18, 2015, pp. 1229-1234.
Kyung, et al., "Ubi-Pen: A Haptic Interface with Texture and Vibrotactile Display", In Journal of IEEE Computer Graphics and Applications, vol. 29, Issue 1, Jan. 2009.
Lee, et al., "Haptic Pen: A Tactile Feedback Stylus for Touch Displays", In Proceedings of the 17th annual ACM symposium on User interface software and technology, Oct. 24, 2004, 4 pages.
Luk, et al., "A role for haptics in mobile interaction: initial design using a handheld tactile display prototype", In Proceedings of the SIGCHI Conference on Human Factors in Computing Systems, Apr. 22, 2006, 10 pages.
"Novint Falcon", Retrieved on: Jun. 21, 2016 Available at: http://www.novint.com/index.php/novintfalcon.
Overholt, Dan, "The MATRIX: A novel controller for musical expression", In Proceedings of the Workshop on New Interfaces for Musical Expression, Apr. 1, 2001, pp. 1-4.
Massie, et al., "The PHANTom Haptic Interface: A Device for Probing Virtual Objects", In Proceedings of the ASME Winter Annual Meeting, Symposium on Haptic Interfaces for Virtual Environment and Teleoperator Systems, Nov. 20, 1994, 6 pages.
Prattichizzo, et al., "Towards Wearability in Fingertip Haptics: A 3-DoF Wearable Device for Cutaneous force feedback", In Journal of IEEE Transactions on Haptics, vol. 6, Issue 4, Oct. 2013, pp. 1-12.
Poupyrev, et al., "Lumen: Interactive Visual and Shape Display for Calm Computing", In Proceedings of 31st international conference on computer graphics and interactive techniques, Aug. 8, 2004, 1 page.
Rekimoto, Jun, "Traxion: A Tactile Interaction Device with Virtual Force Sensation", In Proceedings of the 26th annual ACM symposium on User interface software and technology, Oct. 6, 2013, pp. 427-431.
Salisbury, et al., "Haptic Rendering: Introductory Concepts", In Journal of IEEE Computer Graphics and Applications, vol. 24, Issue 2, Mar. 2004, pp. 24-32.
Sinclair, et al., "TouchMover 2.0-3D Touchscreen with Force Feedback and Haptic Texture", In Proceedings of IEEE Haptics Symposium, Feb. 23, 2014, pp. 1-6.
Summers, et al., "Results from a Tactile Array on the Fingertip", In Proceedings of Eurohaptics, Jul. 1, 2001, 3 pages.
Velázquez, Ramiro, "Wearable Assistive Devices for the Blind", In Publication of Springer, Oct. 2010, 17 pages.
Wang, et al., "Biomechanically optimized distributed transducer based on lateral skin deformation", In International Journal of Robotics Research, vol. 29, No. 4, Apr. 2010, pp. 323-335.
Wellman, et al., "Towards Realistic Vibrotactile Display in Virtual Environments", In Proceedings of the ASME Dynamic Systems and Control Division, Jan. 1995, 10 pages.
Wijntjes, et al., "Local surface orientation dominates haptic curvature discrimination", In Proceedings of IEEE Transactions on Haptics, vol. 2, Issue 2, Apr. 2009, pp. 94-102.
Yano, et al., "Shape and Friction Recognition of 3D Virtual Objects by Using 2-DOF Indirect Haptic Interface", In Proceedings of World Haptics Conference, Jun. 22, 2015, pp. 202-207.
"International Search Report and Written Opinion Issued in PCT Application No. PCT/US2017/048099", dated Nov. 6, 2017, 10 Pages.

* cited by examiner

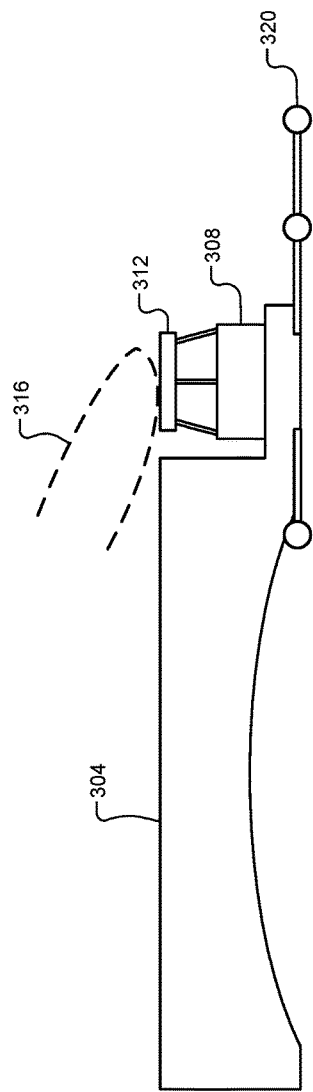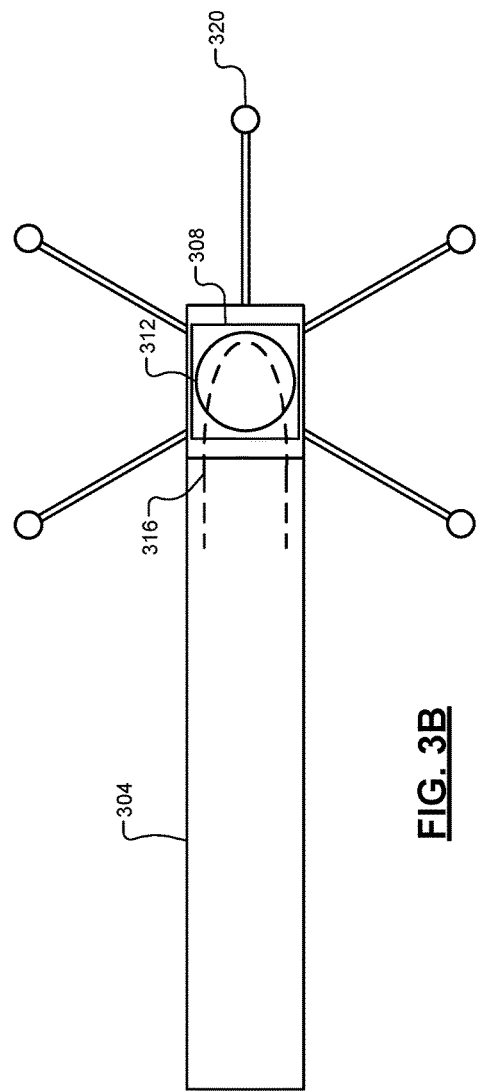

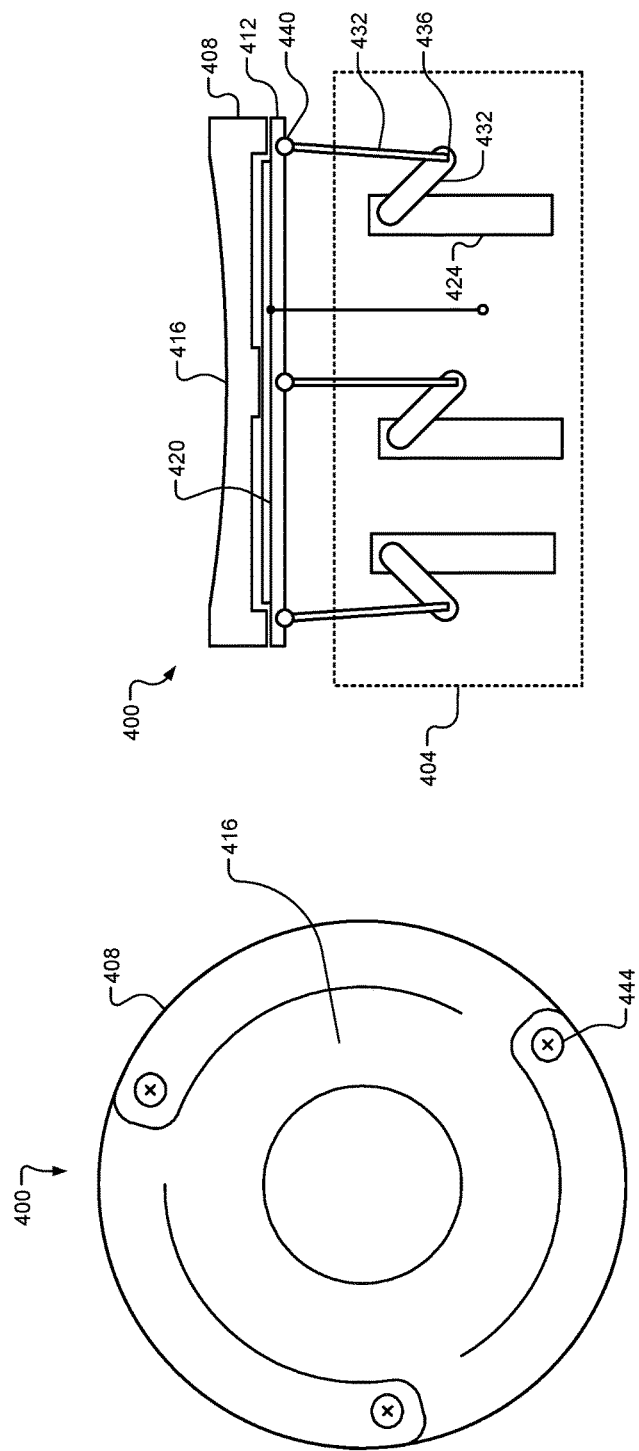

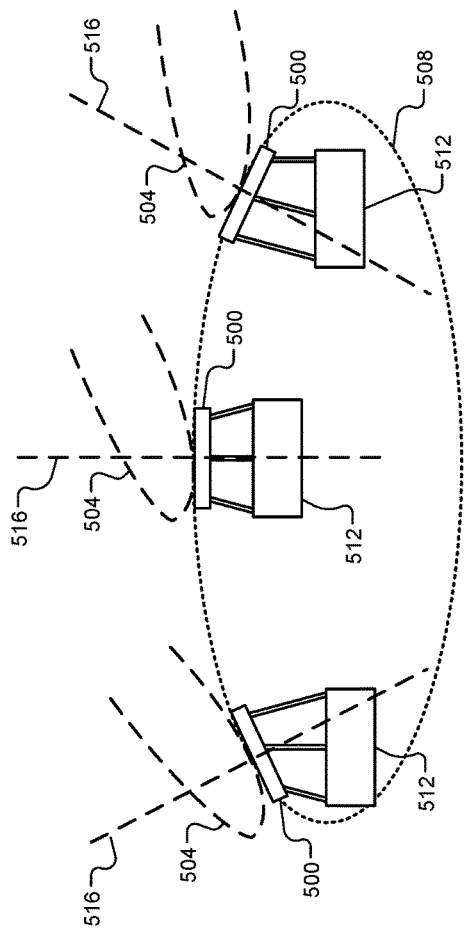
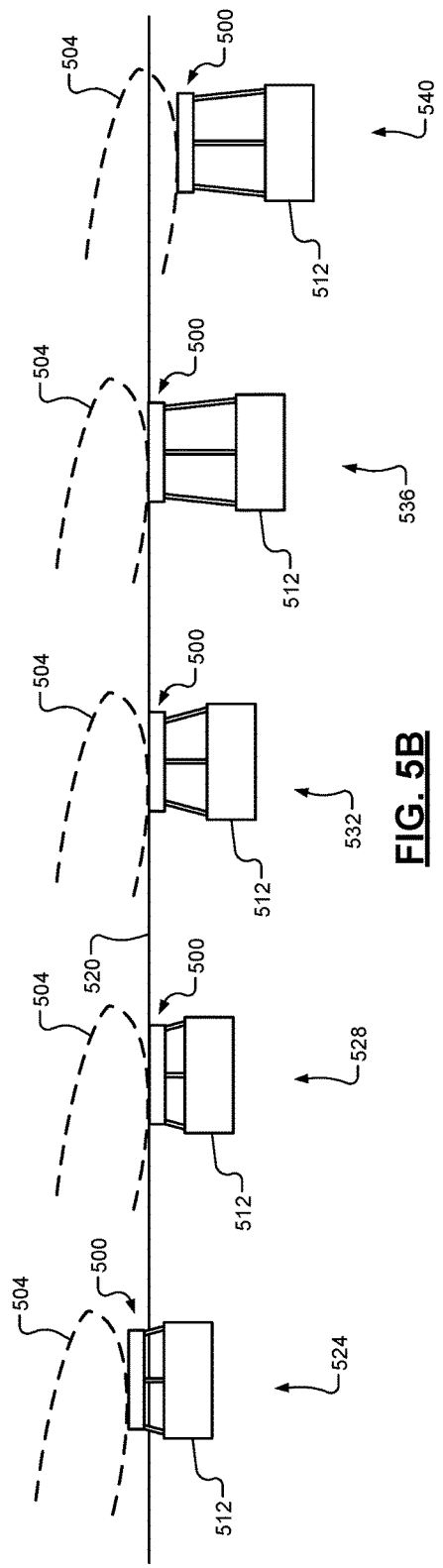
FIG. 5A
FIG. 5B

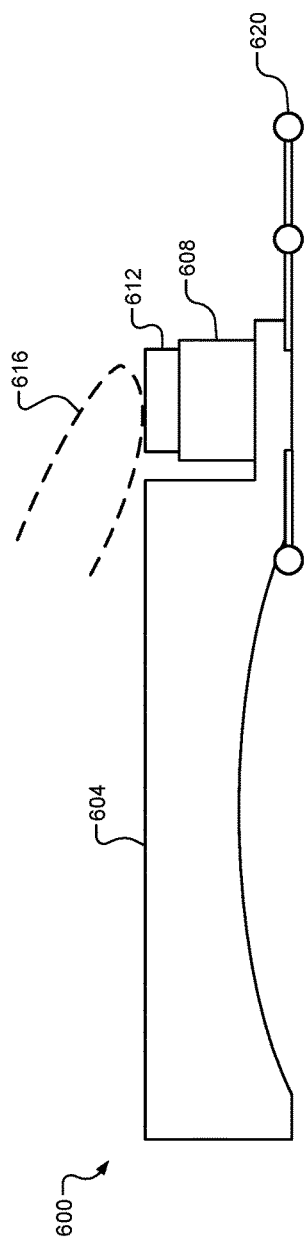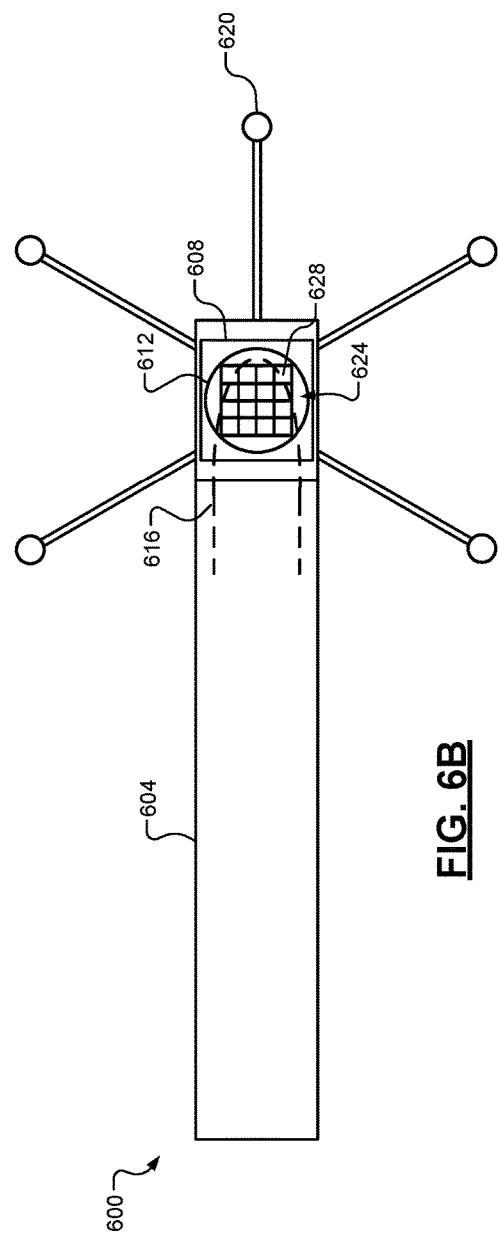

3D HAPTICS FOR INTERACTIVE COMPUTER SYSTEMS

FIELD

The present disclosure relates to providing haptic feedback to a user of a controller device.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Interactive computer systems implementing a virtual environment may include, but are not limited to, virtual reality (VR) systems, augmented reality systems, gaming systems, etc. For example only, VR systems provide a visual and audio representation of a three dimensional (3D) VR environment to a user. In some examples, the VR environment corresponds to a gaming environment. A VR system may provide the visual representation of the VR environment using a display, a headset incorporating a display, etc.

The user may interact with the VR environment or other type of interactive computer system using a one or more controller devices. Controller devices include, but are not limited to, handheld (i.e., remote) controllers, gloves or other wearable devices, etc. configured to communicate with the VR system. For example, the controller devices may provide indications of respective positions (e.g., 6 degree-of-freedom, or 6-DOF, positions) of the controller devices to the VR system. The position indications may further indicate positions, orientations, movements, etc. of the respective hands holding the controller devices. In some examples, the VR system implements optical tracking to determine positions and movements of the controller devices. In this manner, the user is able to interact with (e.g., provide inputs to) the VR environment. The controller devices may also include other input mechanisms, such as buttons, touchpads, trackpads, etc. for receiving user inputs and causing further interaction with the VR environment.

SUMMARY

A controller device for a virtual environment includes a handle and a contact device having a substantially planar surface. A position of the contact device relative to the handle is adjustable. An actuator module is arranged to adjust the position of the contact device relative to the handle. A control module in communication with the virtual environment selectively controls the actuator module to adjust the position of the contact device in response to data received from the virtual environment. The data includes an indication of an interaction between a user and an object represented within the virtual environment.

A method for operating a controller device for a virtual environment includes displaying an object within the virtual environment, generating data including an indication of interaction between a user and a surface of the object, providing the data to an actuator of the controller device, and using the actuator adjusting a position of a contact device relative to a handle of the controller device based on the data.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 3A is a side view of a first example controller device according to the principles of the present disclosure.

FIG. 3B is a plan view of the first example controller device according to the principles of the present disclosure.

FIGS. 4A and 4B are a first example contact device and actuator module according to the principles of the present disclosure.

FIGS. 5A and 5B illustrate example operation of the first example controller device according to the principles of the present disclosure.

FIG. 6A is a side view of a second example controller device according to the principles of the present disclosure.

FIG. 6B is a plan view of the second example controller device according to the principles of the present disclosure.

In the drawings, reference numbers may be reused to identify similar and/or identical elements.

DESCRIPTION

Some controller devices for virtual reality (VR) systems implement one or more mechanisms for providing feedback to the user. The feedback may be indicative of various features of a VR environment (e.g. proximity to objects, such as walls or other structures, the occurrence of an event within a certain range of the user, etc.) and/or responsive to user behavior within the VR environment (e.g., firing a virtual weapon, interacting with an object, etc.).

Example feedback includes vibration, audio indicators (e.g., beeps), etc. The feedback provided to users via handheld or wearable controller devices may not accurately represent the interaction of the user with the VR environment. For example, feedback such as vibration may not accurately convey haptic interaction with objects in the VR environment to the user.

Systems and methods according to the principles of the present disclosure provide haptic feedback to a user in response to interaction with objects, surfaces, etc. in the VR environment. For example, a controller device according to the principles of the present disclosure includes a contact device (e.g., a platform, pad, etc.) with a contact surface arranged to receive a fingertip of the user. The controller device is configured to adjust the contact surface of the contact device according to interaction between the user and the VR environment to provide haptic feedback (e.g., cutaneous and/or kinesthetic feedback). For example, in some implementations, the controller device adjusts an orientation of the contact surface in response to the user touching an object or surface in the VR environment. In other implementations, the controller device adjusts a texture of the contact surface. Although described with respect to VR systems, the principles of the present disclosure may also be included in other interactive computer systems implementing a virtual environment, including, but not limited to, augmented reality systems and gaming systems using a display such as a pc or laptop monitor, a gaming console using a television, etc. Accordingly, as used herein, the term "virtual reality system" may be used to indicate any interactive computer system implementing a virtual environment.

Figure 1:
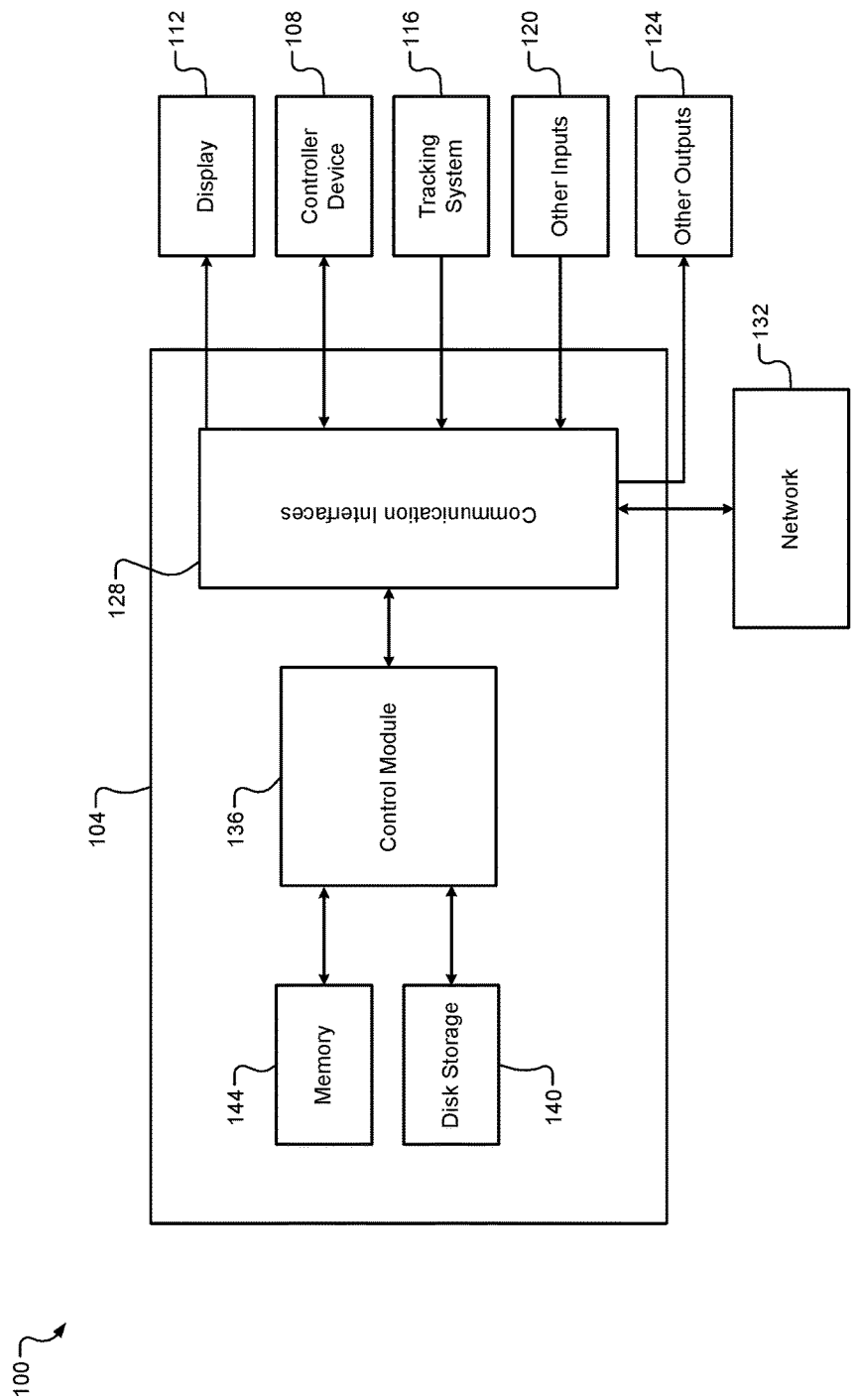
FIG. 1 is an example virtual reality system according to the principles of the present disclosure.

FIG. 1 shows an example VR system 100. The VR system 100 includes a host device (e.g., a computer, gaming console, etc.) 104 and one or more peripheral devices, such as a controller device 108 according to the principles of the present disclosure and a display 112. In some examples, the VR system 100 may include a tracking system 116 (e.g., an optical tracking system) configured to track movements of a user and/or the controller device 108. The VR system 100 may include other inputs 120 (e.g., a keyboard, mouse, wireless inputs, voice input mechanism such as a microphone, etc.) and other outputs 124 (e.g., speakers, secondary displays, wireless outputs, etc.).

The host device 104 includes one or more interfaces 128 for communicating with the peripheral devices. For example, the interfaces 128 may include, but are not limited to, input/output (I/O) interfaces and adapters (e.g., universal serial bus, or USB), and wired or wireless communication interfaces (WiFi, Bluetooth, cellular, wired Ethernet, etc.) for communicating with a network 136. The interfaces 128 allow data to be transmitted between the peripheral devices and/or the network 132 and a control module 136.

The control module 136 controls processing of data related to operation of the VR system 100. For example, the control module 136 may correspond to one or more processors configured to execute an operating system of the host device 104 and one or more programs stored in disk storage 140, memory 144, a cloud computing system (e.g., via network 132), etc. to implement a VR environment. For example only, the disk storage 140 may correspond to a hard disk drive (HDD), solid state drive (SSD), a removable media drive such as a CD or DVD ROM drive, flash memory, etc. The memory 144 may correspond to system memory and may include, but it is not limited to, volatile and/or non-volatile semiconductor memory.

Figure 2:
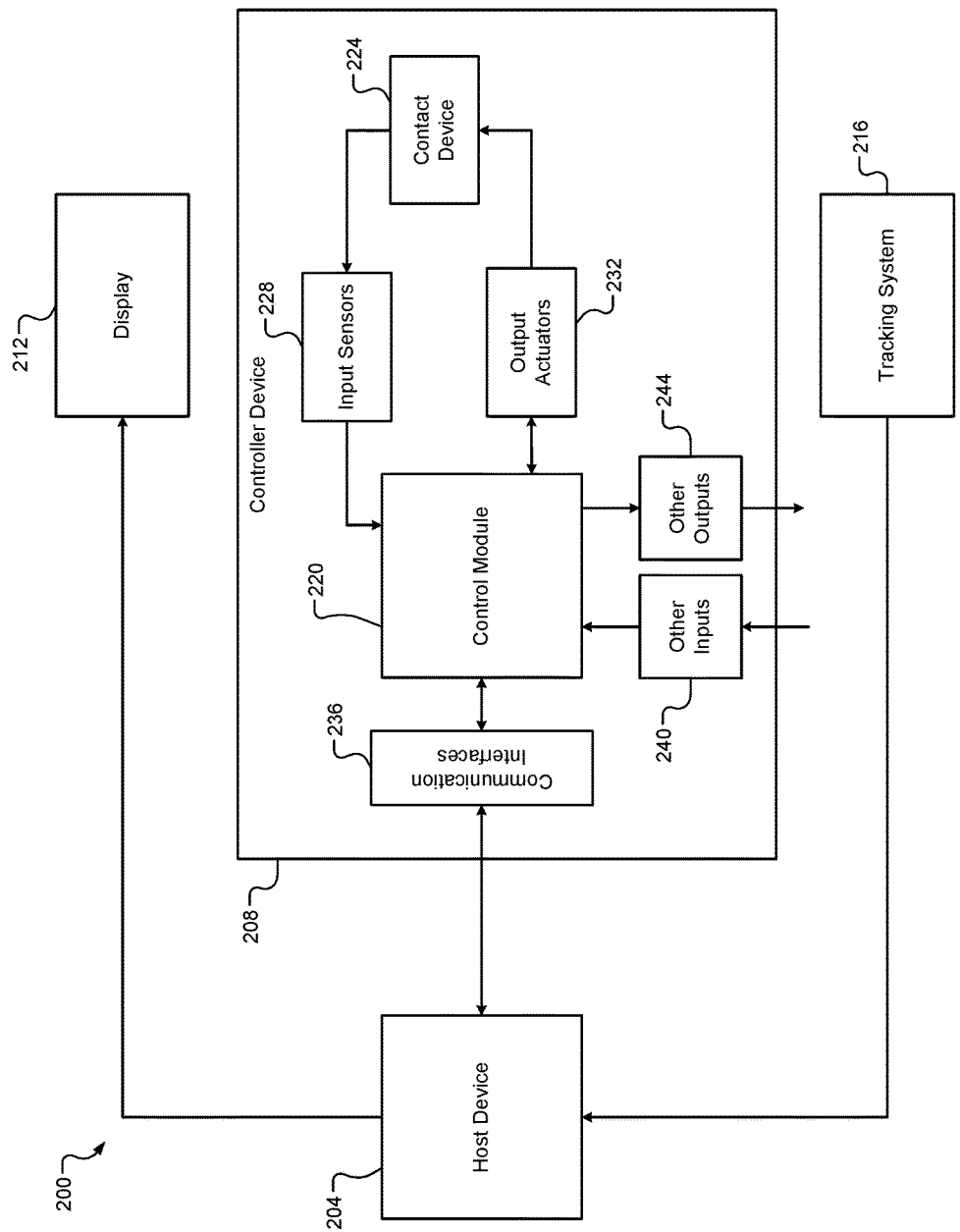
FIG. 2 is a simplified virtual reality system including a controller device shown in more detail according to the principles of the present disclosure.

FIG. 2 shows a simplified VR system 200 including only a host device 204, controller device 208, display 212, and tracking system 216. The controller device 208 includes a control module 220, a contact device 224, input sensors 228, and output actuators 232 configured to implement the systems and methods according to the principles of the present disclosure. The controller device 208 includes communication interfaces (e.g., wired and/or wireless communication interfaces) 236 for communicating data between the controller device 208 and the host device 204. The controller device 208 may include other inputs 240 and other outputs 244. For example, the other inputs 240 may include, but are not limited to, a microphone for receive voice inputs, buttons, a touchpad or touchscreen interface (e.g., for providing an indication of a relative position of a fingertip on the contact device 224), etc. The other outputs 244 may include, but are not limited to, audio outputs, an integrated display, LEDs, other feedback mechanisms (e.g., vibration), etc. The control module 220 controls the operation of the controller device 208 based on data received from the host device 204, contact device 224, and inputs 240, and provides data indicative of user interaction with the controller device 204 to the host device 204 as described below in more detail.

The host device 204 provides interaction data indicative of user interaction with the VR environment to the control module 22. For example, the user interacts with the VR environment (e.g., as presented to the user via the display 212) using the controller device 208. In some examples, the tracking system 216 tracks user movement by monitoring movement of the controller device 208 and provides tracking data indicative of the user movement to the host device 204. The host device 204 generates and outputs the interaction data based on the tracking data received from the tracking system and, in some examples, further based on user input data received from the controller device 208 (e.g., user input data generated in response to user interaction with contact device 224, inputs 240, etc.).

The control module 220 controls the contact device 224 based on the interaction data. For example, the interaction data may include characteristics of the interaction between the user and the VR environment. The characteristics may correspond to contact characteristics associated with contact between the user (e.g., a fingertip of the user in the VR environment) and an object in the VR environment, including, but not limited to, surface contour, shape, and texture of the object, as well as an amount of force exerted on and/or by the object. Accordingly, the control module 220 controls the output actuators 232 to physically adjust the contact device 224 so that contact between the contact device 224 and an actual fingertip of the user reflects the contact between the fingertip of the user and the object in the VR environment. In some examples, input sensors 228 (which may include force or finger position sensors) provide additional feedback indicative of contact between the user and the contact device 224.

Referring now to FIGS. 3A and 3B and with continued reference to FIG. 2, a first example controller device 300 according to the principles of the present disclosure is shown in a side view and a plan view, respectively. The controller device 300 includes a handle 304, an actuator module 308 arranged on a first end of the handle 304, and a contact device 312 mounted on the actuator module 308. The contact device 308 is arranged to receive a fingertip 316 of a user. Although the contact device 308 as shown corresponds to a substantially circular platform, the contact device 308 may have any suitable shape in other examples (e.g., rectangular, elliptical, etc.). In some examples, the controller device 300 may include one or more tracking elements 320 (e.g., retroreflective spheres) detectable by the tracking system 216 arranged to facilitate tracking of the movement of the controller device 300 in 3D space. Other examples may implement other suitable systems and methods for tracking movement of the controller device 300. For example only, components such as the control module 220, the actuator module 308, etc. may be located within a housing of the handle 304.

The actuator module 308 selectively physically adjusts the contact device 312 based on interaction data received from the host device 204 as described above with respect to FIG. 2. For example, the actuator module 308 may include servos or other suitable mechanisms in communication with respective actuator arms 324. The actuator module 308 may be configured to independently actuate (e.g., extend and retract) the actuator arms 324 to adjust the position of (e.g., tilt to adjust yaw and pitch, raise, lower, etc.) the contact device 312 relative to the handle 304 (and, therefore, relative to the fingertip 316). As the user moves the controller device 300 to cause contact between the fingertip of the user (i.e., a virtual fingertip) with an object in the VR environment, the actuator module 308 adjusts the position of the contact device 312 accordingly. The visual representation of the fingertip of the user within the VR environment may also be adjusted to indicate the contact (e.g., by tilting or extruding the finger).

Referring now to FIGS. 4A and 4B, an example contact device 400 and actuator module 404 are shown. The contact device 400 includes substantially planar upper and lower platforms 408 and 412. The upper platform 408 may have a concave upper surface 416. In some examples, the platform 408 is formed from acetal or other plastic material. In some examples, a force sensor (e.g., a force transducer) 420 is arranged between the upper and lower platforms 408 and 412 to detect an amount of force applied to the contact device 400 by a user.

The actuator module 404 includes servo motors 424 configured to adjust the contact device 400 via respective control arms 428 and actuator arms 432 (e.g., responsive to commands from the control module 220). As shown, the actuator module 404 includes three servo motors 424, control arms 428, and actuator arms 432 to provide three degrees of freedom movement of the contact device 400. For example only, the control arms 428 are connected to the actuator arms 432 via respective revolute joints 436 and the actuator arms 432 are connected to the contact device 400 via ball-and-socket spherical joints 440.

For example only, the force sensor 420 comprises a force sensing resistor (FSR) material and two internal electrodes for detecting compression between the upper and lower platforms 408 and 412 in response to force applied to the upper platform 408 by the user. In some examples, the upper platform 408 is connected to the lower platform 412 via adjustable screws or other fasteners 444 at respective ends of radial arms 448 around an outer perimeter of the upper platform 408. For example, the arms 444 may be formed in the material of the upper platform 408 to allow downward movement of an inner portion of the upper platform 408 in response to force applied by the user.

When no force is applied to the upper platform 408, electrodes of the force sensor 420 do not contact each other and no voltage is generated. Conversely, a minimal amount of force applied to the upper platform 408 causes contact between the electrodes of the force sensor 420, and a voltage is generated accordingly to indicate an amount of force applied to the contact device 400 by the user. In some examples, the arms 444 may be configured to bias the upper platform 408 downward against the force sensor 420 even without contact from a user. Accordingly, a nominal voltage may be generated by the force sensor 420 with no user contact, while the voltage may increase proportionately to an amount of force applied to the upper platform 408 by the user. The voltage is provided as feedback indicative of the amount of force applied by the user (e.g., to the control module 220).

Operation of an example contact device 500 is described below with respect to FIGS. 5A and 5B. In FIG. 5A, the contact device 500 is shown in a plurality of example positions relative to a fingertip 504 of a user. As shown, the positions of the contact device 500 correspond to a contact point between a virtual fingertip of the user and a surface of an example object 508 in a VR environment. For example, the virtual fingertip of the user (e.g., as rendered and provided to the user via the display 212) moves within the VR environment based on movement of the controller device 300. Accordingly, as the user moves the controller device 300, the virtual fingertip moves relative to the object 508 and contacts different points along the surface of the object 508. The contact device 500 is adjusted (e.g., tilted) as movement of the controller device 300 causes the virtual fingertip to make initial contact with the object 508, contact different portions of the object 508, discontinue contact with the object 508, etc. For example, as the virtual fingertip "slides" along the surface of the object 508, the contact device 500 is tilted accordingly (e.g. relative to the controller device 300, a mounting portion such as actuator module 512, etc.). For example only, the contact device 500 is adjusted such that the contact device 500 is substantially perpendicular to a surface normal 516 of the object 508 at a contact point between the virtual fingertip and the object 508.

In FIG. 5B, the contact device 500 is shown in a plurality of positions (e.g., height positions) as a virtual fingertip of a user contacts a surface 520 in the VR environment. At 524, the virtual fingertip is not in contact with the surface 520 and therefore the contact device 500 is shown in a fully retracted position. At 528, the virtual fingertip is in contact with the surface 520.

Continued downward movement of the controller device 300 may cause the virtual fingertip to penetrate the surface 520. The contact device 500 according to the principles of the present disclosure may be extended in response to movement that would otherwise cause the virtual fingertip to penetrate the surface 520 within the VR environment. For example, at 532, the contact device 500 is extended to apply upward force against the fingertip 504 of the user. In other words, as the controller device 300 is moved downward, the fingertip 504 is nonetheless maintained in a same position due to the opposing, upward movement of the contact device 500. In this manner, the contact device 500 indicates to the user that the movement of the controller device 300 is causing the virtual fingertip to attempt to penetrate the surface 520.

If user behavior continues to cause the virtual fingertip to move downward toward the surface 520, the contact device 500 is extended still further as shown at 536. The position of the contact device 500 as shown at 536 may correspond to a fully extended position. Accordingly, further downward movement of the controller device 300 allows corresponding movement of the fingertip 504, resulting in penetration of the surface 520 as shown at 540. In some examples, a position of the virtual fingertip (and a virtual hand, which corresponds to a position of the controller device 300) as rendered in the VR environment may be decoupled from further movement of the controller device 300 to compensate for penetration of the surface 520. For example, rather than allowing the virtual fingertip to penetrate the surface 520 in response to continued movement of the controller device 300, the contact device 500 may be maintained in a partially extended position (e.g., 50% or 75% of a fully extended position) while maintaining presentation of the virtual fingertip on the surface 520. Accordingly, if penetration of the surface 520 by the user is inadvertent, the user is nonetheless able to interact with the surface 520.

Referring now to FIGS. 6A and 6B, a second example controller device 600 according to the principles of the present disclosure is shown in a side view and a plan view, respectively. The controller device 600 includes a handle 604, an actuator module 608 arranged on a first end of the handle 604, and a contact device 612 mounted on the actuator module 308. The contact device 608 is arranged to receive a fingertip 616 of a user. Although the contact device 608 as shown corresponds to a substantially circular platform, the contact device 608 may have any suitable shape in other examples (e.g., rectangular, elliptical, etc.). In some examples, the controller device 600 may include one or more tracking elements 620 (e.g., retroreflective spheres) detectable by the tracking system 216 arranged to facilitate tracking of the movement of the controller device 600. For example only, components such as the control module 220, the actuator module 608, etc. may be located within a housing of the handle 604.

The actuator module 608 selectively adjusts the contact device 612 based on interaction data received from the host device 204 as described above with respect to FIG. 2. In this example, the contact device 612 includes a tactile array 624 (e.g., as shown, a 4×4 array) of adjustable pins 628. The actuator module 608 includes servos and/or other suitable mechanisms configured to independently actuate respective ones of the pins 628. For example, the actuator module 608 independently actuates (e.g., extends and retracts) the pins 628 to adjust the position of (e.g., tilt, raise, lower, etc.) the tactile array 624 relative to the handle 604 (and, therefore, relative to the fingertip 616). As the user moves the controller device 600 to cause contact between the fingertip of the user (i.e., a virtual fingertip) with an object in the VR environment, the actuator module 608 adjusts respective positions of the pins 628 of the tactile array 624 accordingly.

Figure 7:
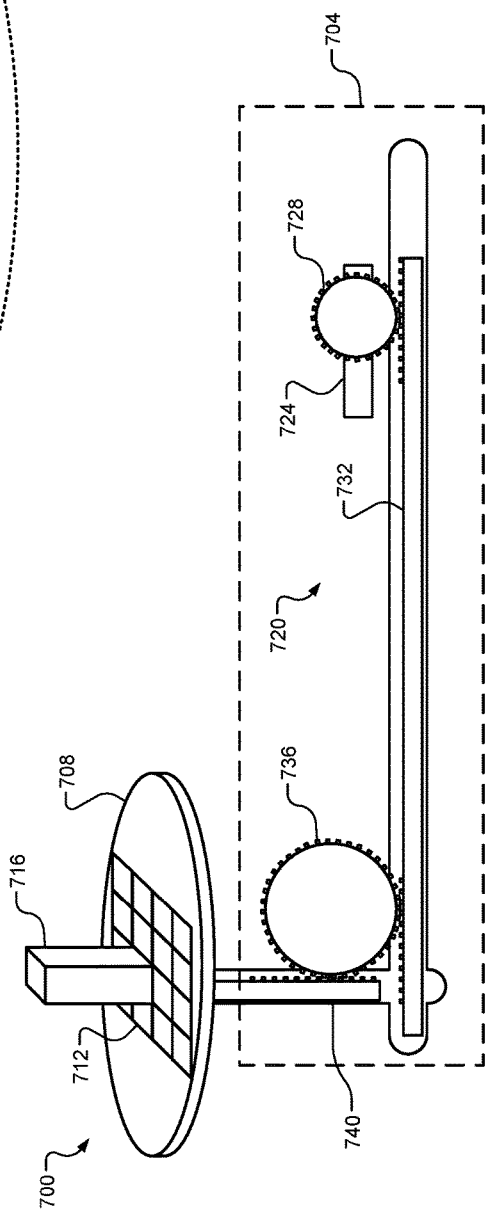
FIG. 7 is a second example contact device and actuator module according to the principles of the present disclosure.
Figure 9:
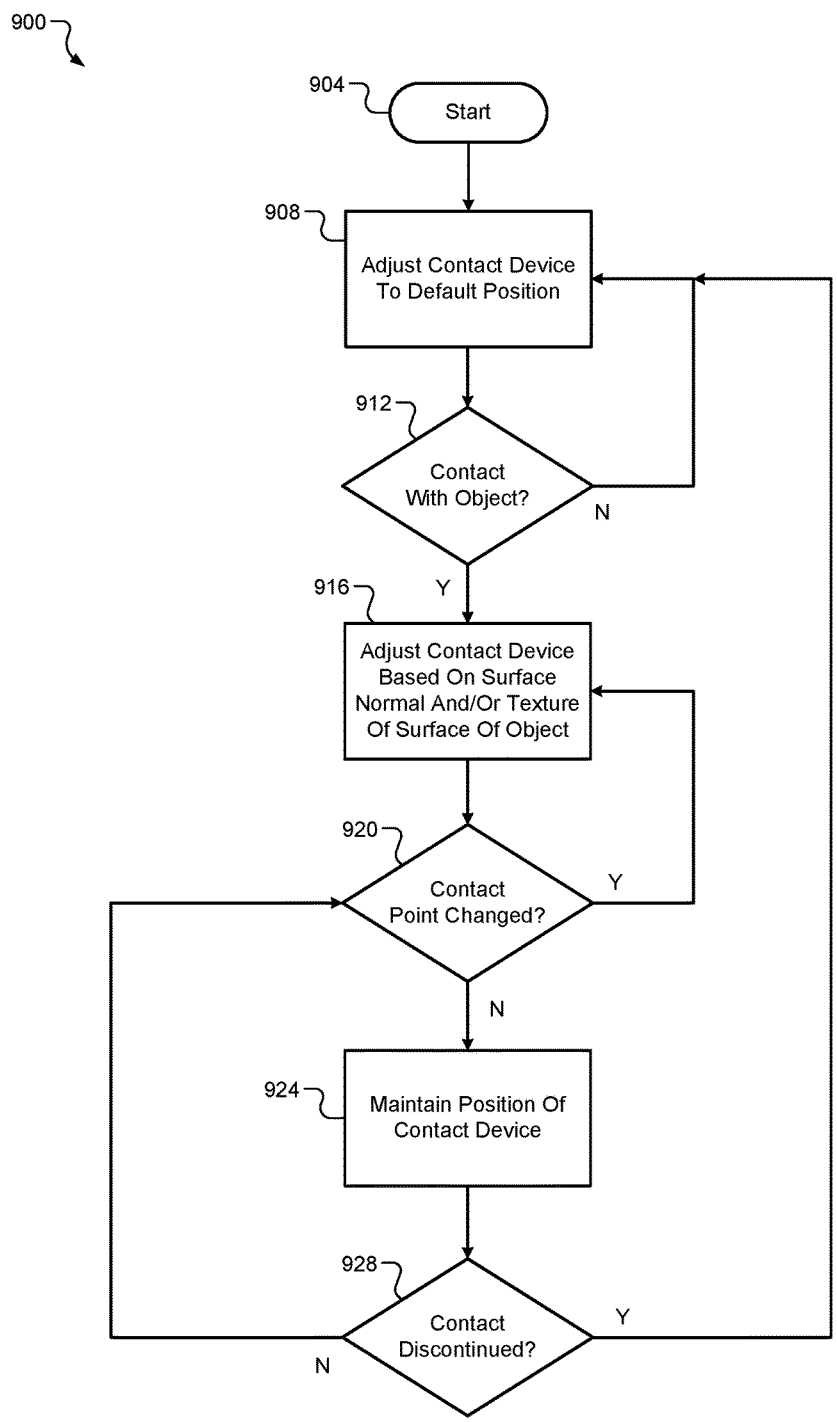
FIG. 9 is an example method for providing feedback to a user of a virtual reality system according to the principles of the present disclosure.

Referring now to FIG. 7, an example contact device 700 and actuator module 704 are shown. The contact device 700 includes a substantially planar upper platform 708 including a 4×4 tactile array 712 of sixteen pins 716. Although the tactile array 712 has a 4×4 configuration, other examples may use a different configuration (e.g., 3× 4, 5× 5, 4× 6, etc.). The actuator module 704 is configured to independently actuate (e.g., extend and retract) each of the pins 716 based on interaction with an object in the VR environment.

For example, the actuator module 704 includes a plurality of linear actuator systems 720 in communication with respective ones of the pins 716, although only a single linear actuator system 720 is shown for simplicity. For example only, the linear actuator system 720 has a rack and pinion configuration. Each of the linear actuator systems 720 includes a servo motor 724 configured to rotate a first spur or pinion gear 728. Rotation of the first spur gear 728 causes linear actuation of rack gear 732, which in turn causes rotation of second spur gear 736. The second spur gear 736 is mechanically coupled to a lower gear portion 740 of the pin 716. Accordingly, horizontal linear actuation of the rack gear 732 is translated to vertical linear actuation of the pin 716. In this manner, the actuator module 704 adjusts the tactile array 712 to represent contact between a user and a surface in the VR environment (e.g., responsive to commands from the control module 220).

Figure 8:
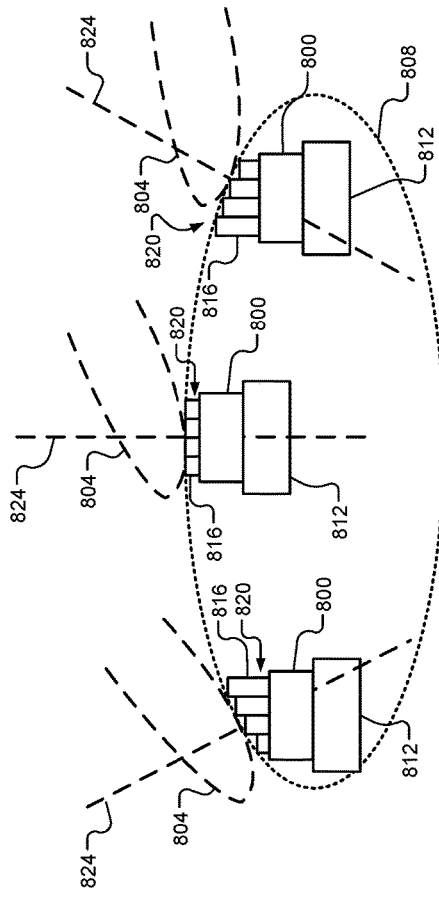
FIG. 8 illustrates example operation of the second example controller device according to the principles of the present disclosure.

Operation of an example contact device 800 is shown below in FIG. 8. The contact device 800 is shown in a plurality of example configurations relative to a fingertip 804 of a user. As shown, the positions of the contact device 800 correspond to a contact point between a virtual fingertip of the user and a surface of an example object 808 in a VR environment. For example, the virtual fingertip of the user (e.g., as rendered and provided to the user via the display 212) moves within the VR environment based on movement of the controller device 600. Accordingly, as the user moves the controller device 600, the virtual fingertip moves relative to the object 808 and contacts different points along the surface of the object 808. The contact device 800 is adjusted as movement of the controller device 600 causes the virtual fingertip to make initial contact with the object 808, contact different portions of the object 808, discontinue contact with the object 808, etc.

For example, as the virtual fingertip "slides" along the surface of the object 808, actuator module 812 selectively extends and/or retracts pins 816 of tactile array 820. For example only, the pins 816 are adjusted to a configuration such that a plane defined by the tactile array 820 is substantially perpendicular to a surface normal 816 of the object 808 at a contact point between the virtual fingertip and the object 808. In some examples, the pins 816 may be further adjusted based on a texture of the surface of the object 808. For example, for an object 808 having a substantially flat and smooth surface, each of the pins 816 can be adjusted to a same height to provide a smooth surface. Conversely, for an object 808 having a rough surface, the pins 816 can be adjusted to different heights to provide a rough surface. In some examples, the tactile array 820 may include a flexible or stretchable membrane arranged over the pins 816.

The controller devices 300 and 600 may implement additional features. For example, the controller devices 300 and 600 may include a vibration mechanism (e.g., corresponding to the other outputs 244 of FIG. 2) configured to vibrate in response to user contact and/or lateral movement with a surface of an object in the VR environment. For example, the vibration mechanism may be configured to vibrate as a function of movement speed of the controller device 300 or 600 relative to the surface of the object. In this manner, vibration may be indicative of the texture (e.g., roughness) of the surface. Other features may include, but are not limited to, a heater or other temperature output device to provide temperature feedback, inputs such as touchpads or force sensors incorporated within the respective contact devices 312 and 612, etc. Some example VR systems may include two or more of the controller devices 300 or 600, and/or include both the controller device 300 and the controller device 600.

An example method 900 for providing feedback to a user of a VR system according to the principles of the present disclosure begins at 904. At 908, the method 900 adjusts a contact device of a controller (e.g., a handheld controller such as the controller device 300 or 600) to a default position. For example, the default position may correspond to a fully lowered or retracted position with a neutral orientation relative to the controller. For example only, in the default position, a planar surface of the contact device may be substantially parallel to a horizontal axis of the controller.

At 912, the method 900 determines whether an appendage of a user (e.g., a fingertip) contacts a surface of an object in the VR environment. If true, the method 900 continues to 916. If false, the method 900 continues to 908. At 916, the method 900 adjusts the contact device based on the contact with the object. For example, the method 900 may adjust a position of the contact device based on a surface normal of the object at a contact point between the user and the object in the VR environment. At 920, the method 900 determines whether the contact point between the user and the object changed due to movement of the user. If true, the method 900 continues to 916. If false, the method 900 continues to 924. At 924, the method 900 maintains the position of the contact device.

At 928, the method 900 determines whether the user has discontinued contact with the object in the VR environment. If true, the method 900 continues to 908 and returns the contact device to the default position. If false, the method 900 continues to 920.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A controller device for a virtual environment, the controller device comprising:
a handle;
a contact device having a substantially planar surface, wherein a position of the contact device relative to the handle is adjustable;
an actuator module, arranged on a first end of the handle, including a plurality of actuator arms configured to adjust the position of the contact device relative to the handle, wherein the contact device is mounted on the actuator module via the plurality of actuator arms; and
a control module in communication with the virtual environment, wherein the control module selectively controls one or more actuator arms of the plurality of actuator arms of the actuator module to adjust the position of the contact device in response to data received from the virtual environment, wherein the data includes an indication of an interaction between a user and an object represented within the virtual environment.

2. The controller device of claim 1, wherein the contact device includes a platform, and wherein, to adjust the position of the contact device, the actuator module at least one of (i) tilts the platform and (ii) extends and retracts the platform.

3. The controller device of claim 1, wherein, to adjust the position of the contact device, the actuator module adjusts the position of the contact device based on a contact point between the user and the object represented within the virtual environment.

4. The controller device of claim 3, wherein the actuator module adjusts the position of the contact device based on a surface normal to the object at the contact point.

5. The controller device of claim 3, wherein the actuator module adjusts the position of the contact device based on a determination of whether movement of the controller device causes the user to penetrate the object represented within the virtual environment.

6. The controller device of claim 5, wherein the actuator module selectively extends the contact device based on the determination of whether movement of the controller device causes the user to penetrate the object represented within the virtual environment.

7. The controller device of claim 1, wherein the contact device includes at least one of a force sensor, a vibration mechanism, a temperature output device, and a touchpad.

8. The controller device of claim 7, wherein the force sensor comprises a force sensing resistor.

9. The controller device of claim 7, wherein the force sensor generates a signal in response to user contact with the contact device.

10. A method for operating a controller device for a virtual environment, the method comprising:
displaying an object within the virtual environment;
generating data including an indication of interaction between a user and a surface of the object;
providing the data to an actuator of the controller device; and
using the actuator, adjusting a position of a contact device relative to a handle of the controller device based on the data, wherein the contact device has a substantially planar surface, wherein the actuator is arranged on a first end of the handle and include a plurality of actuator arms configured to adjust the position of the contact device relative to the handle, and wherein the contact device is mounted on the actuator module via the plurality of actuator arms,
wherein the position of the contact device is adjusted in response to data received from the virtual environment by selectively controlling one or more actuator arms of the plurality of actuator arms of the actuator.

11. The method of claim 10, wherein adjusting the position of the contact device includes at least one of (i) tilting the contact device and (ii) extending and retracting the contact device.

12. The method of claim 10, wherein adjusting the position of the contact device includes adjusting the position of the contact device based on a contact point between the user and the surface of the object.

13. The method of claim 12, wherein adjusting the position of the contact device includes adjusting the position of the contact device based on a surface normal to the object at the contact point.

14. The method of claim 10, further comprising, using the contact device, generating a signal in response to user contact with the contact device.

15. A controller device for a virtual environment, the controller device comprising:
a handle;
a platform having a substantially planar surface, wherein a position of the platform relative to the handle is adjustable;
an actuator module, arranged on a first end of the handle, including a plurality of actuator arms configured to adjust the position of the platform relative to the handle, wherein the platform is mounted on the actuator module via the plurality of actuator arms; and
a control module in communication with the virtual environment, wherein the control module:
receives data indicative of contact between a user and a surface represented within the virtual environment, wherein the data includes an indication of a surface normal of the surface at a contact point between the user and the surface, and
provides a command to adjust the position of the platform based on the indication of the surface normal,
wherein the actuator module selectively controls one or more actuator arms of the plurality of actuator arms to adjust the position of the platform relative to the handle in response to the command provided by the control module such that a surface normal to the platform in the adjusted position corresponds to the surface normal at the contact point between the user and the surface.

16. The controller device of claim 15, wherein, to adjust the position of the platform, the actuator module at least one of (i) tilts the platform and (ii) extends and retracts the platform.

17. The controller device of claim 15, wherein, to adjust the position of the platform, the actuator module adjusts the position of the platform based on a contact point between the user and the object represented within the virtual environment.

18. The controller device of claim 17, wherein the actuator module adjusts the position of the platform based on a determination of whether movement of the controller device causes the user to penetrate the object represented within the virtual environment.

19. The controller device of claim 18, wherein the actuator module selectively extends the contact device based on the determination of whether movement of the controller device causes the user to penetrate the object represented within the virtual environment.

20. The controller device of claim 15, wherein the platform includes at least one of a force sensor, a vibration mechanism, a temperature output device, and a touchpad.

* * * * *